US008674968B2

(12) United States Patent
Lin et al.

(10) Patent No.: US 8,674,968 B2
(45) Date of Patent: Mar. 18, 2014

(54) TOUCH SENSING METHOD AND ASSOCIATED CIRCUIT

(75) Inventors: Tsung-Fu Lin, Hsinchu Hsien (TW); Tso Min Chen, Hsinchu Hsien (TW); Yi Cheng Hsieh, Hsinchu Hsien (TW); Guo-Kiang Hung, Hsinchu Hsien (TW)

(73) Assignee: MStar Semiconductor, Inc. (TW)

( * ) Notice: Subject to any disclaimer, the term of this patent is extended or adjusted under 35 U.S.C. 154(b) by 818 days.

(21) Appl. No.: 12/690,678

(22) Filed: Jan. 20, 2010

(65) Prior Publication Data

US 2010/0117987 A1 May 13, 2010

Related U.S. Application Data

(63) Continuation-in-part of application No. 11/425,719, filed on Jun. 22, 2006.

(60) Provisional application No. 60/596,141, filed on Sep. 2, 2005, provisional application No. 60/694,687, filed on Jun. 29, 2005.

(30) Foreign Application Priority Data

Jan. 21, 2009 (TW) ................................ 98102299 A

(51) Int. Cl.
*G06F 3/038* (2013.01)
*G09G 5/00* (2006.01)
*G06F 3/041* (2006.01)
*G02B 26/08* (2006.01)

(52) U.S. Cl.
USPC ............................ 345/204; 345/173; 359/290

(58) Field of Classification Search
USPC ........................................................ 345/204
See application file for complete search history.

(56) References Cited

U.S. PATENT DOCUMENTS 4,541,066 A 9/1985 Lewandowski
5,729,720 A 3/1998 Kau et al.

(Continued)

FOREIGN PATENT DOCUMENTS

CN 2443552 8/2001
CN 1499248 A 5/2004

(Continued)

OTHER PUBLICATIONS

First Examination Opinion issued by State Intellectual Property Office of China on Apr. 8, 2011 regarding Chinese Patent Application No. 200910001179.1 (Document Serial No. 2011040400020450).

*Primary Examiner* — Charles V Hicks
(74) *Attorney, Agent, or Firm* — Han IP Corporation

(57) ABSTRACT

A touch sensing method and associated circuit are provided. In one aspect, a touch control circuit includes a first current source, a second current source, a plurality of switches, a hysteresis comparator, a frequency divider and a flip-flop. The switches are couple to a plurality of external contact points. The hysteresis comparator is coupled to a first reference comparison voltage and a second reference comparison voltage. Each of the external contact points is selectively coupled to an input terminal of the hysteresis comparator through the switches. The first current source and the second current source are coupled to the input terminal of the hysteresis comparator to generate a sensing voltage. The hysteresis comparator compares the sensing voltage with the first reference comparison voltage and the second reference comparison voltage to generate a hysteresis comparison output to control the first current source or the second current source.

16 Claims, 11 Drawing Sheets

(56) References Cited

U.S. PATENT DOCUMENTS

| | | | | |
|---|---|---|---|---|
| 5,757,365 | A | 5/1998 | Ho | |
| 6,281,700 | B1 | 8/2001 | Matsueda | |
| 7,092,140 | B2 * | 8/2006 | Pan et al. | 359/290 |
| 7,425,949 | B2 | 9/2008 | Lin et al. | |
| 8,294,494 | B2 * | 10/2012 | Hagino et al. | 327/131 |
| 2002/0125863 | A1 | 9/2002 | Lin et al. | |
| 2003/0178951 | A1 | 9/2003 | Park et al. | |
| 2004/0056825 | A1 * | 3/2004 | Min et al. | 345/38 |
| 2004/0100439 | A1 | 5/2004 | Chao | |
| 2006/0049959 | A1 | 3/2006 | Sanchez | |
| 2006/0197735 | A1 | 9/2006 | Vuong et al. | |
| 2006/0256093 | A1 * | 11/2006 | Furukawa et al. | 345/173 |
| 2008/0007534 | A1 * | 1/2008 | Peng et al. | 345/173 |

FOREIGN PATENT DOCUMENTS

| | | | |
|---|---|---|---|
| CN | 1573460 | A | 2/2005 |
| CN | 1892305 | A | 1/2007 |
| CN | 101207377 | A | 6/2008 |
| JP | 7325286 | A | 12/1995 |
| TW | 523706 | | 3/2003 |
| WO | WO2004072733 | A2 | 8/2004 |

* cited by examiner

TOUCH SENSING METHOD AND ASSOCIATED CIRCUIT

CROSS REFERENCE TO RELATED PATENT APPLICATION

This patent application claims priority benefit of Taiwan, R.O.C. patent application No. 098102299, filed on Jan. 21, 2009, entitled "TOUCH SENSING METHOD AND ASSOCIATED CIRCUIT", and is a Continuation in Part of U.S. patent application Ser. No. 11/425,719, filed Jun. 22, 2006, entitled "Flat Panel Display Device, Controller and Method for Displaying Images", which claims benefit of U.S. Provisional Application Nos. 60/694,687 and 60/596,141, filed Jun. 29, 2005 and Sep. 2, 2005, respectively, which applications are hereby incorporated by reference.

TECHNICAL FIELD

The present disclosure is related to a capacitive touch control method and associated circuit, and more particularly to a capacitive touch control method applied in a display controller and the associated circuit.

BACKGROUND

Several light emitting diodes (LEDs) and corresponding buttons, which control special functions, are typically provided at the top edge of a notebook keyboard. Alternatively, several buttons may be provided on a computer screen or a television control in an on-screen display (OSD). With the development of touch control technologies, small-size touch panels are also gradually applied to high-level products to raise the additional value of products by saving buttons as well as increasing reliability by lowering the probability of damaging buttons from excessive utilization.

FIG. 1 shows a prior art small-size display circuit 10. Buttons 1 to 7 control the emissions of LEDs D1 to D7. Resistors R1 to R7 are current-limiting resistors connected to a display controller (not shown) by a connector 12.

FIG. 2 shows another prior art small-size touch display circuit 20 that includes a contact plate 22 and a touch controller 24. The contact plate 22, coupled to the touch controller 24, provides a plurality contact points CS0 to CS5. A signal 26 grounds the touch controller 24 to the contact plate 22. The signal strength from touching effects is very weak and can be easily interfered by the environment. Conventionally, the touch controller 24, fabricated as an independent integrated circuit (IC), is needed and is provided adjacent to the contact plate 22 to prevent noise disturbance. Therefore, the small-size touch display circuit 20, formed by the contact plate 22 and the touch controller 24, needs to be implemented on an independent small-size circuit located far from other control circuit board or power board, which leads to increased manufacturing costs.

Therefore, there is a need to develop a touch control solution capable of reducing costs.

SUMMARY OF THE DISCLOSURE

In one aspect, the present disclosure provides a display controller comprising a touch control circuit and a pulse width modulation (PWM) circuit. The touch control circuit asserts a touch reset signal to detect whether a contact point is touched. The PWM circuit, coupled to the touch control circuit, generates a PWM signal. The touch reset signal and the PWM signal are associated with an image synchronous signal, which is, for example, a horizontal synchronous signal, a vertical synchronous signal or an output horizontal synchronous signal. The touch reset signal aligns with the image synchronous signal. Further, the touch control circuit receives the image synchronous signal to generate a synchronous signal to the PWM circuit, which then generates the PWM signal to align with the synchronous signal.

In another aspect, the present disclosure provides a touch control circuit, as an integrated part of a display controller, comprising a first current source, a second current source, a plurality of switches, a hysteresis comparator, a frequency divider, and a flip-flop. The switches are coupled to a plurality of external contact points, respectively. The hysteresis comparator, coupled to a first reference comparison voltage and a second reference comparison voltage, couples one of the contact points to an input terminal thereof through the switches. The first current source and the second current source are coupled to the input terminal of the hysteresis comparator to generate a sensing voltage. Then the hysteresis comparator compares the sensing voltage with the first reference comparison voltage and the second reference comparison voltage to generate a hysteresis comparison output for alternatively enabling the first current source and the second current source. The frequency divider receives the hysteresis comparison output and starts frequency dividing to generate a frequency-divided signal. The flip-flop is coupled to the frequency divider for sampling the frequency-divided signal, to generate the sampling output, which represents whether a frequency of the hysteresis comparison output is higher than a predetermined value.

In yet another aspect, the present disclosure provides a touch sensing method, which is applied to a display controller, that includes: generating a touch reset signal associated with an image synchronous signal; generating a sensing voltage with a sensing frequency in response to the touch reset signal corresponding to a contact point; and determining whether the contact point is touched according to the sensing frequency. When it is determined that the contact point is touched, a control sequence is generated to control emissions of a plurality of light emitting diodes on a contact plate.

BRIEF DESCRIPTION OF THE DRAWINGS

The present disclosure will become more readily apparent to those ordinarily skilled in the art after reviewing the following detailed description and accompanying drawings, in which.

DETAILED DESCRIPTION OF THE PREFERRED EMBODIMENT

Figure 1:
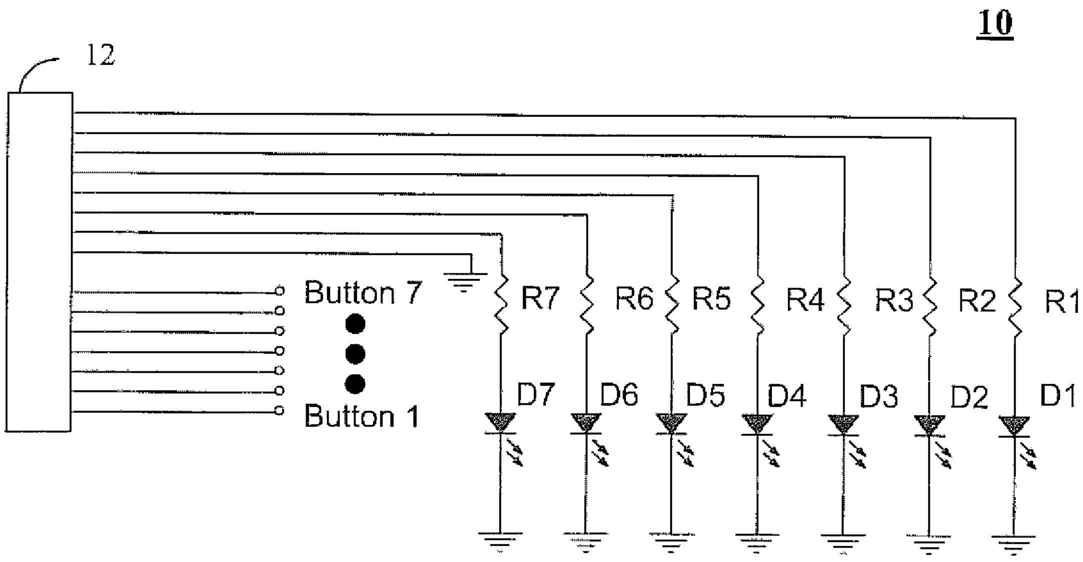
FIG. 1 shows a small-size display circuit according to the prior art.
Figure 2:
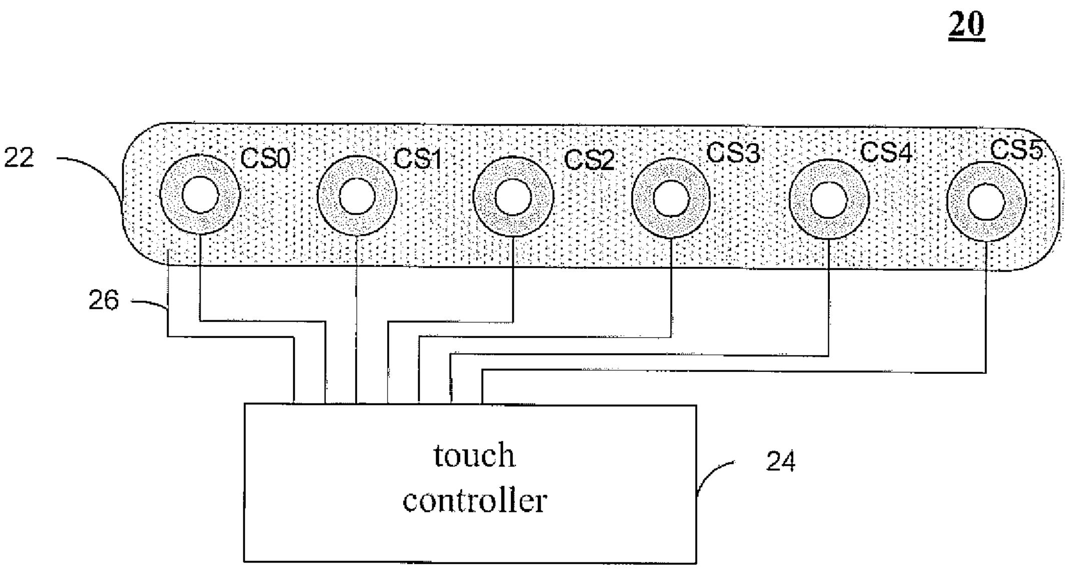
FIG. 2 shows a small-size touch display circuit according to the prior art.
Figure 3:
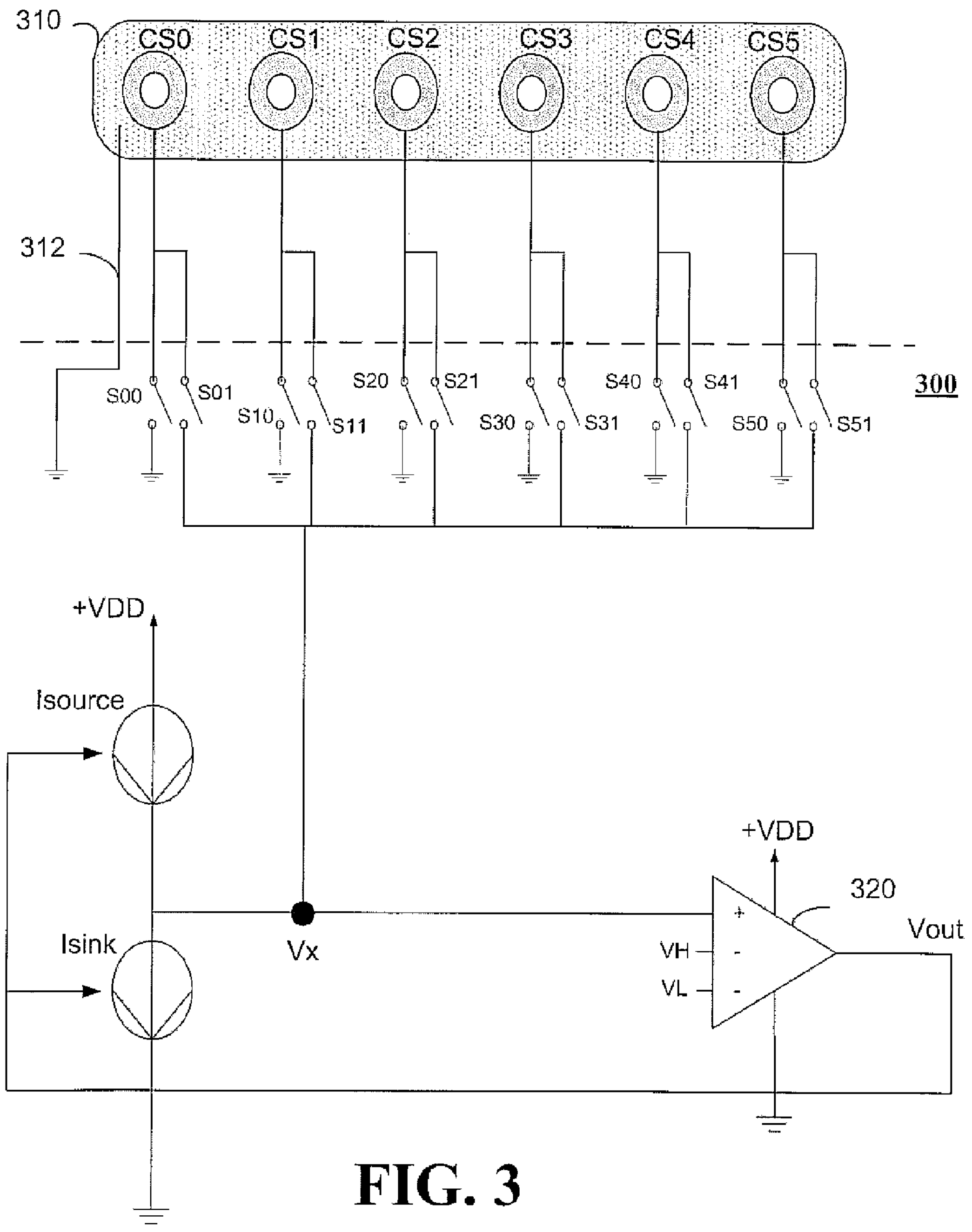
FIG. 3 shows a capacitive touch control circuit integrated into a display controller according to one embodiment of the present disclosure.

FIG. 3 shows a capacitive touch control circuit 300 integrated into a display controller according to one embodiment of the present disclosure. The display controller can be a scaler or a television controller. The capacitive touch control circuit 300 comprises a plurality of switches S00 to S51, current sources $I_{source}$ and $I_{sink}$, and a hysteresis comparator 320. The capacitive touch control circuit 300 is coupled to a contact plate 310. In this embodiment, the contact plate 310 provides six contact points CS0 to CS5, and is grounded through a signal 312. The contact points CS0 to CS5 on the contact plate 310 provide different equivalent capacitances depending on the position on the contact plate 310 where a user is touching. For example, to sense the position touched by a user, the capacitive touch control circuit 300 switches on the switches S01 S11, S21, S31, S41 and S51 in sequence in order to couple the six contact points CS0 to CS5 to a positive terminal of the hysteresis comparator 320 in sequence while grounding the remaining five contact points. For example, when the contact point CS2 is to be sensed, the capacitive touch control circuit 300 switches on the switch S21 and grounds the remaining five contact points—an equivalent circuit thereof is shown in FIG. 4.

Figure 4:
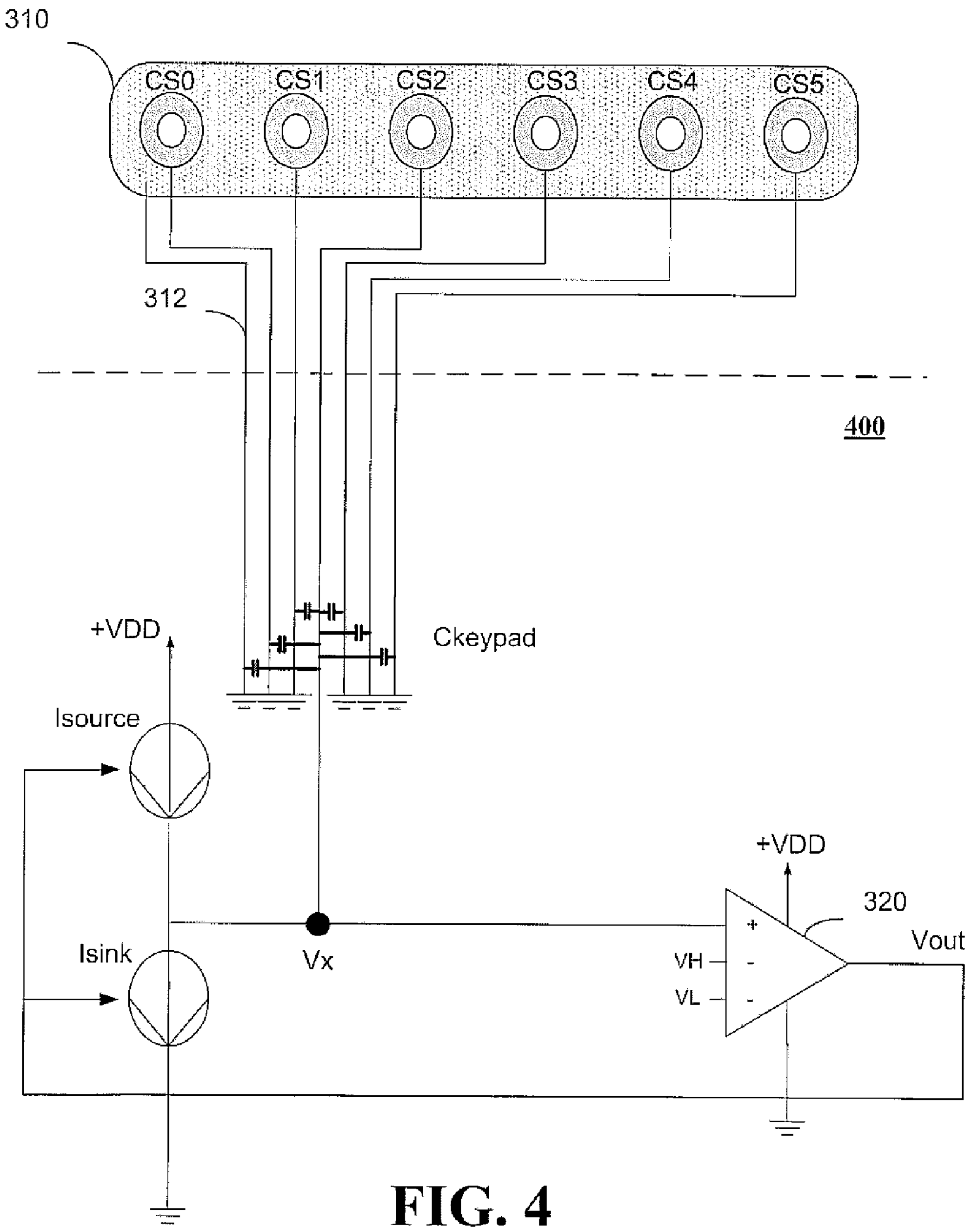
FIG. 4 shows an equivalent circuit of sensing contact points in FIG. 3 according to one embodiment of the present disclosure.

FIG. 4 shows an equivalent circuit 400 for sensing the contact point CS2 according to the embodiment in FIG. 3. In this embodiment, the contact point CS2 is coupled to the positive terminal of the hysteresis comparator 320, and the remaining five contact points are grounded. Different capacitance of a capacitor $C_{keypad}$ is generated according to the position touched by a user. Preferably, the current source $I_{source}$ is provided for charging the capacitor $C_{keypad}$ to generate a charging voltage $V_x$. The hysteresis comparator 320 compares the charging voltage $V_x$ with reference comparison voltages $V_H$ and $V_L$ to generate a hysteresis comparison output $V_{out}$. The hysteresis comparison output $V_{out}$ may control operations of the current source $I_{source}$ and $I_{sink}$. At first, the voltage $V_x$ is low before being charged. The current source $I_{source}$ is enabled to charge the capacitor $C_{keypad}$ while the current source $I_{sink}$ is disabled. When the voltage $V_x$ rises to reach the reference comparison voltage $V_H$, the hysteresis comparison output Vout changes from low to high. Meanwhile, the current source $I_{source}$ is disabled and the current source $I_{sink}$ is enabled to discharge the voltage $V_x$ toward the reference comparison voltage $V_L$. Then the hysteresis comparison output Vout changes from high to low. The current source $I_{source}$ is enabled to charge the capacitor $C_{keypad}$ and the current source $I_{sink}$ is disabled. The above procedure is repeated to provide different sensing frequencies corresponding to the different capacitance values of the capacitor $C_{keypad}$. For example, the human body, mainly composed of water, is a good conductor compared with the air. Therefore, when the contact point CS2 is touched by a user, the charging time increases and the sensing frequency of the contact point CS2 decreases.

Figure 5:
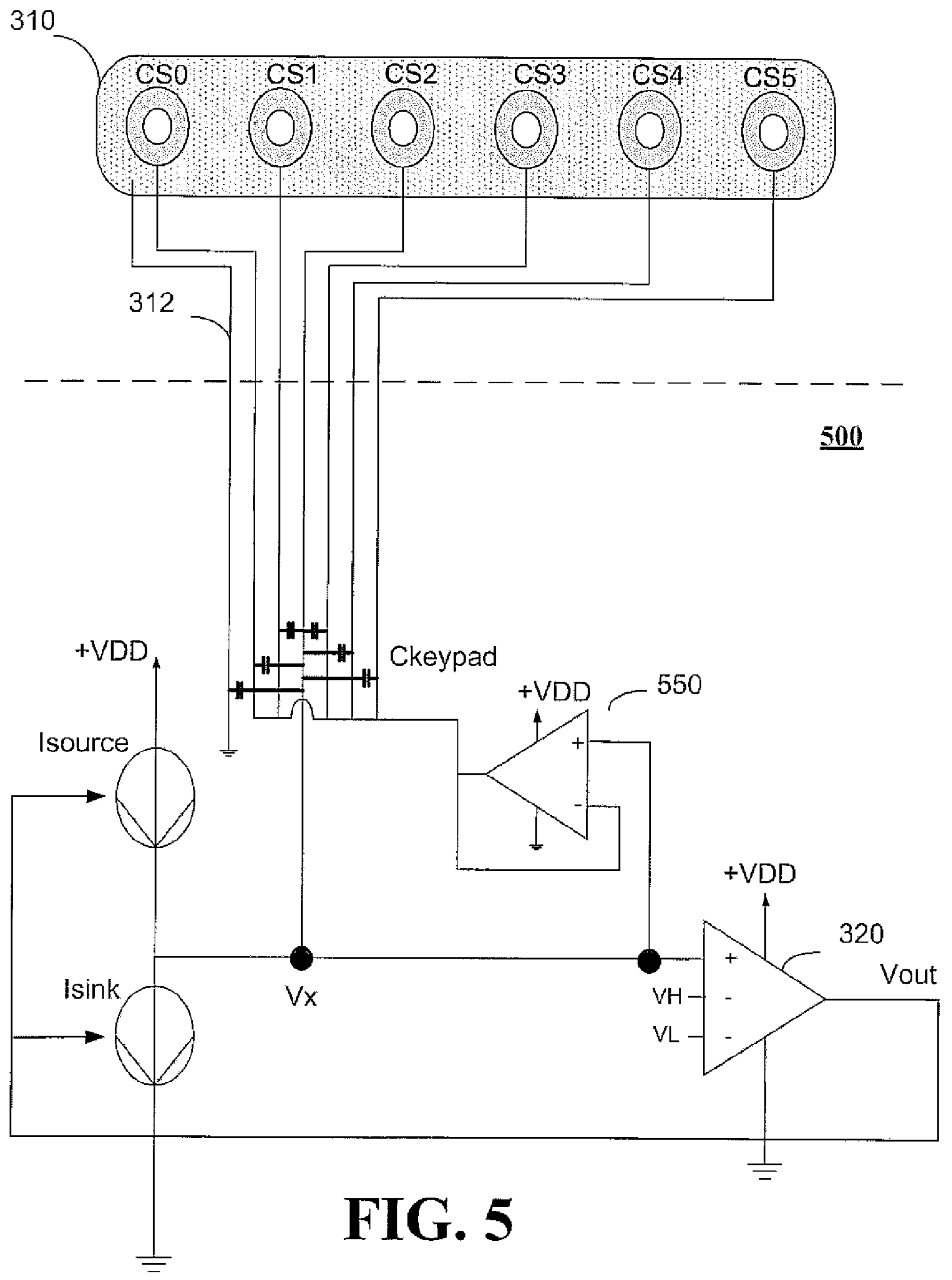
FIG. 5 shows a capacitive touch control circuit integrated into a display controller according to another embodiment of the present disclosure.

FIG. 5 shows a capacitive touch control circuit 500 integrated into a display controller according to another embodiment of the present disclosure. The circuit structure is similar to the embodiment in FIG. 3 except an additional buffer 550 is provided in the touch control circuit 500. The contact plate 310 is connected to the capacitive touch control circuit 300 through a long connecting cable. In this embodiment, a plurality of contact points, not being sensed, are coupled to the negative terminal and the output terminal of the buffer 550 through the switches S00 to S51. The contact point CS2 which is being sensed is coupled to the positive terminal of the buffer 550 to provide signal shielding for improving the quality of signals.

Figure 6:
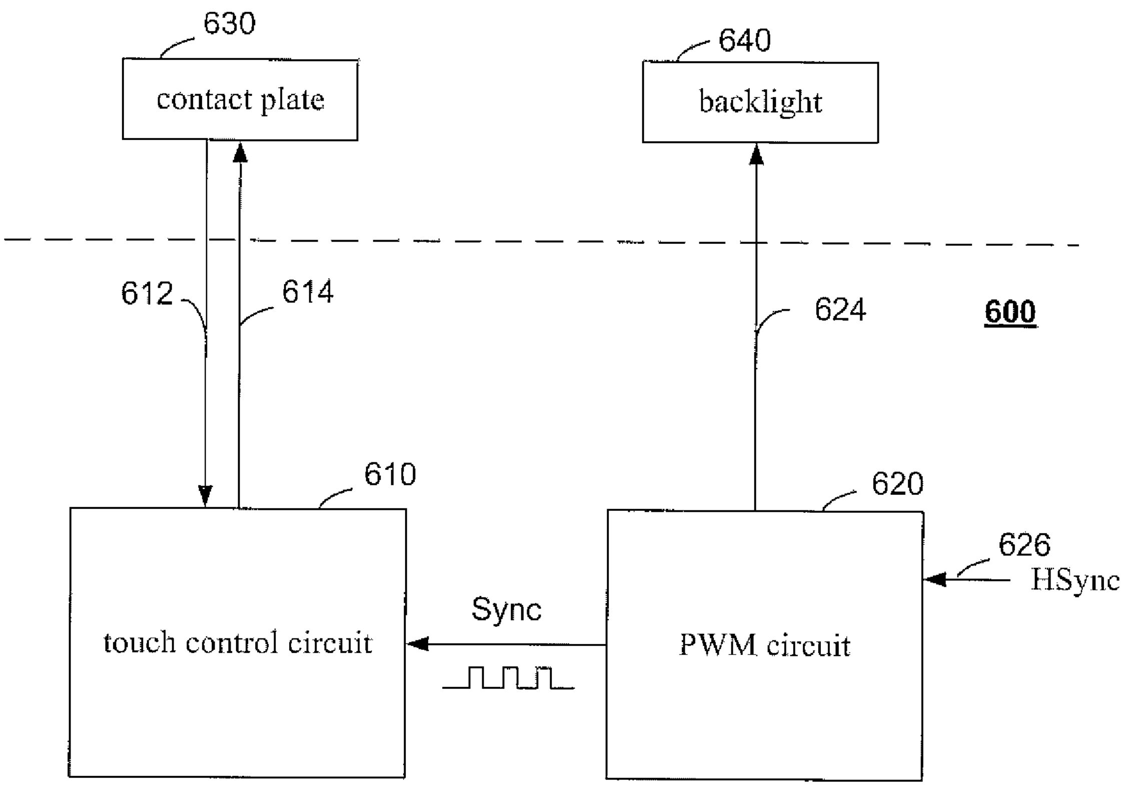
FIG. 6 shows a block diagram of a display controller integrating a touch control circuit according to one embodiment of the present disclosure.

FIG. 6 shows a block diagram of a display controller 600 integrating a touch control circuit 610 according to one embodiment of the present disclosure. The display controller 600 comprises the touch control circuit 610 and a pulse width modulation (PWM) circuit 620. The touch control circuit 610 is coupled to the PWM circuit 620. The touch control circuit 610 and a contact plate 630 may be realized according to the above mentioned embodiments as shown in FIG. 3 through FIG. 5. The touch control circuit 610 senses the touch of the contact plate 630 by a user through a signal 612, and controls the emissions of a plurality of LEDs (not shown) on the contact plate 630 through a signal 614. The PWM circuit 620 receives an image synchronous signal 626, and generates a PWM signal 624 with reference to the image synchronous signal 626, to control an operation of a backlight 640. Therefore, the waves of the PWM signal 624 is associated with the image synchronous signal 626. For example, the PWM signal 624 may be synchronized with the image synchronous signal 626. However, it should be noted that the signal synchronization does not imply that the frequency of the PWM signal 624 is necessarily the same as that of the image synchronous signal 626. For example, the generated frequency of the PWM signal 624 is proportional to that of the image synchronous signal 626, and the rising edges of the PWM signal 624 and the image synchronous signal 626 are aligned. In this embodiment, the PWM circuit 620, according to the PWM signal 624, generates a synchronous signal Sync to trigger the touch control circuit 610. The touch control circuit 610 then operates in response to the synchronous signal Sync. For example, the touch control circuit 610 internally asserts a touch reset signal TP_reset (not shown) according to the synchronous signal Sync, and generates an internal control signal to control the switching operation of the switches S00 to S51 in FIG. 3. Therefore, the operations of the touch control circuit 610 and the PWM circuit 620 are associated with the image synchronous signal 626. The image synchronous signal 626 may be a horizontal synchronous signal Hsync, a vertical synchronous signal Vsync, or an output horizontal synchronous signal OHsync.

The PWM circuit 620 generates the PWM signal 624 to control the backlight 640. For example, the backlight 640 comprises a plurality of LEDs. The PWM circuit 620 may be realized by a microcontroller in the display controller 600. With reference to the image synchronous signal 626, the microcontroller may control an internal counter to count a predetermined value, and thus determine the width of the high and low levels of the PWM signal 624. Via a general purpose input/output (GPIO) pin of the display controller 600, the PWM signal 624 is outputted to control the operation of the backlight 640. The backlight 640 may comprise a cold cathode fluorescent tube, which can be referenced in the U.S. application Ser. No. 11/425,719 filed on Jun. 22, 2006 and which is incorporated herein in its entirety by reference.

Figure 7:
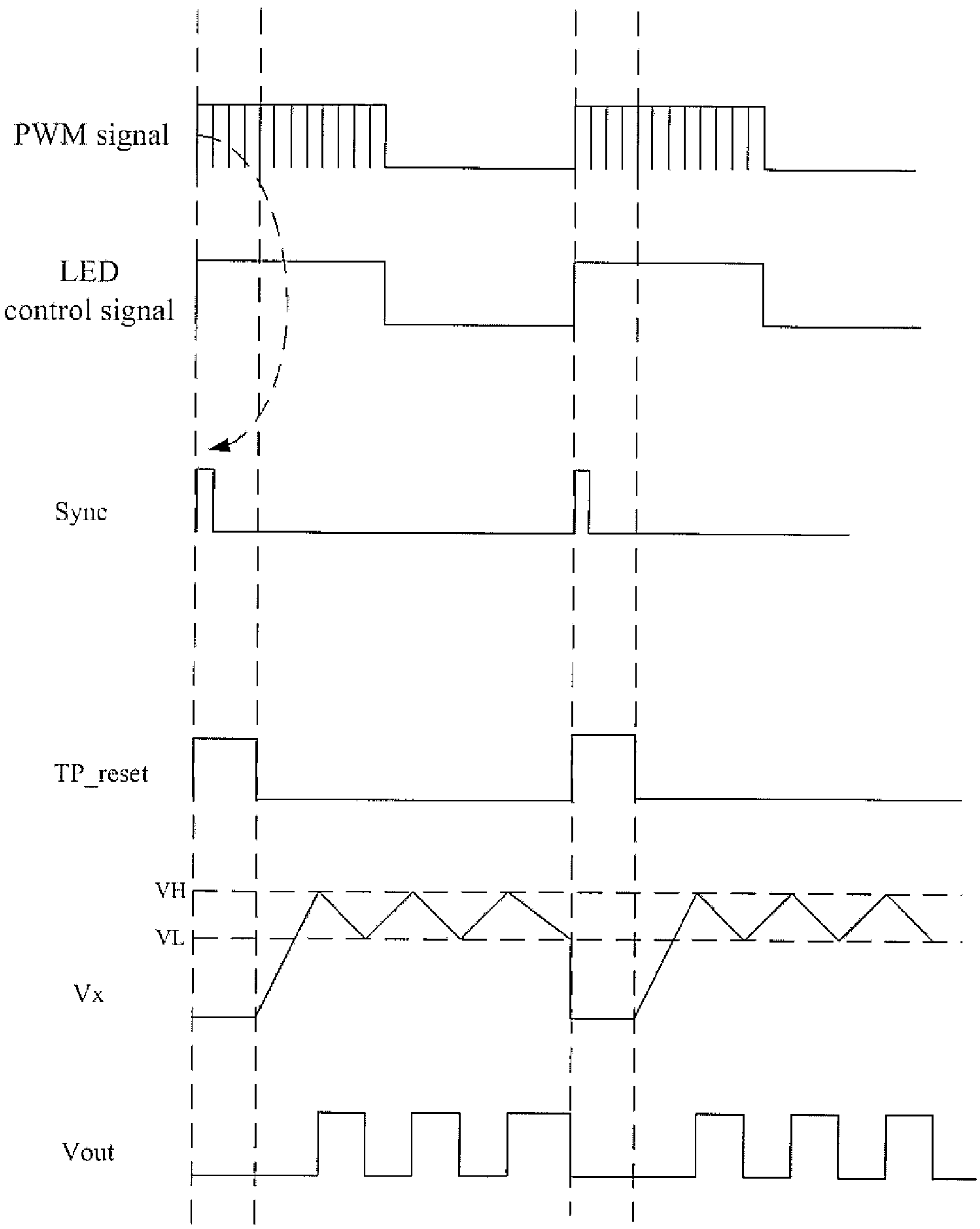
FIG. 7 shows an oscillogram of signals associated with the embodiments in FIG. 3 and FIG. 6.

FIG. 7 shows an oscillogram of signals associated with the embodiments in FIG. 3 and FIG. 6, wherein the PWM signal 624 or the LED control signal is generated in response to the image synchronous signal 626. The PWM circuit 620 generates the synchronous signal Sync, based on which the touch control circuit 610 asserts the touch reset signal TP_reset, and the voltage $V_X$ oscillates between the reference comparison voltages $V_H$ and $V_L$ to generate the sensing frequency. More specifically, a square wave with the sensing frequency is generated at the hysteresis comparator 320's output as Vout. The square wave with the sensing frequency may be provided to a back-end digital circuit in the display controller 600 for subsequent processing, or may operate with appropriate software, to determine which contact point is touched. The algorithm of detecting the sensing frequency may be modified in various ways, such as using a counter to count the number of times of triggering during a predetermined period of time.

Figure 8:
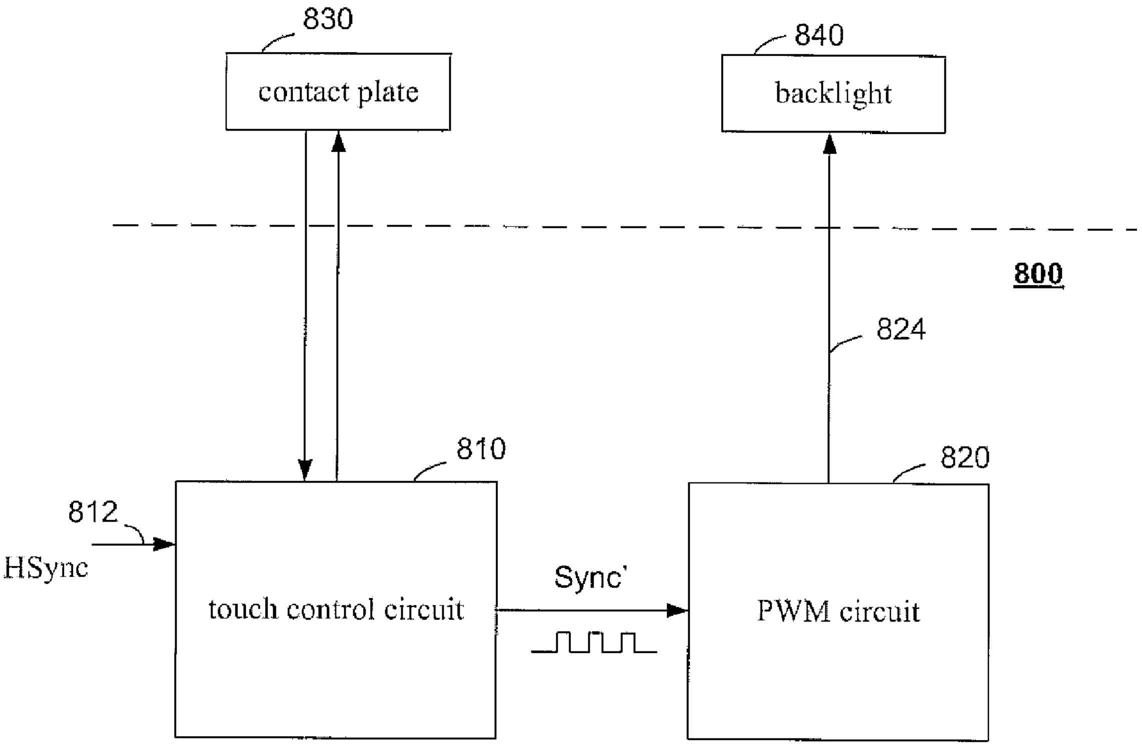
FIG. 8 shows a block diagram of a display controller integrating a touch control circuit according to another embodiment of the present disclosure.

FIG. 8 shows a block diagram of a display controller 800 with a touch control circuit 810 integrated therein according to another embodiment of the present disclosure. The display controller 800 comprises the touch control circuit 810 coupled to an external contact plate 830, and a PWM circuit 820 coupled to a backlight 840. The structure is similar to that of the embodiment in FIG. 6, except that the touch control circuit 810 receives an image synchronous signal 812 and asserts the touch reset signal TP_reset associated with the image synchronous signal 812. The image synchronous signal 812 may be the horizontal synchronous signal Hsync, the vertical synchronous signal Vsync, or the output horizontal synchronous signal OHsync. The touch control circuit 810 provides a synchronous signal Sync' associated with the touch reset signal TP_reset to the PWM circuit 820 to generate a PWM signal 824. This tends to minimize signal noises.

Figure 9:
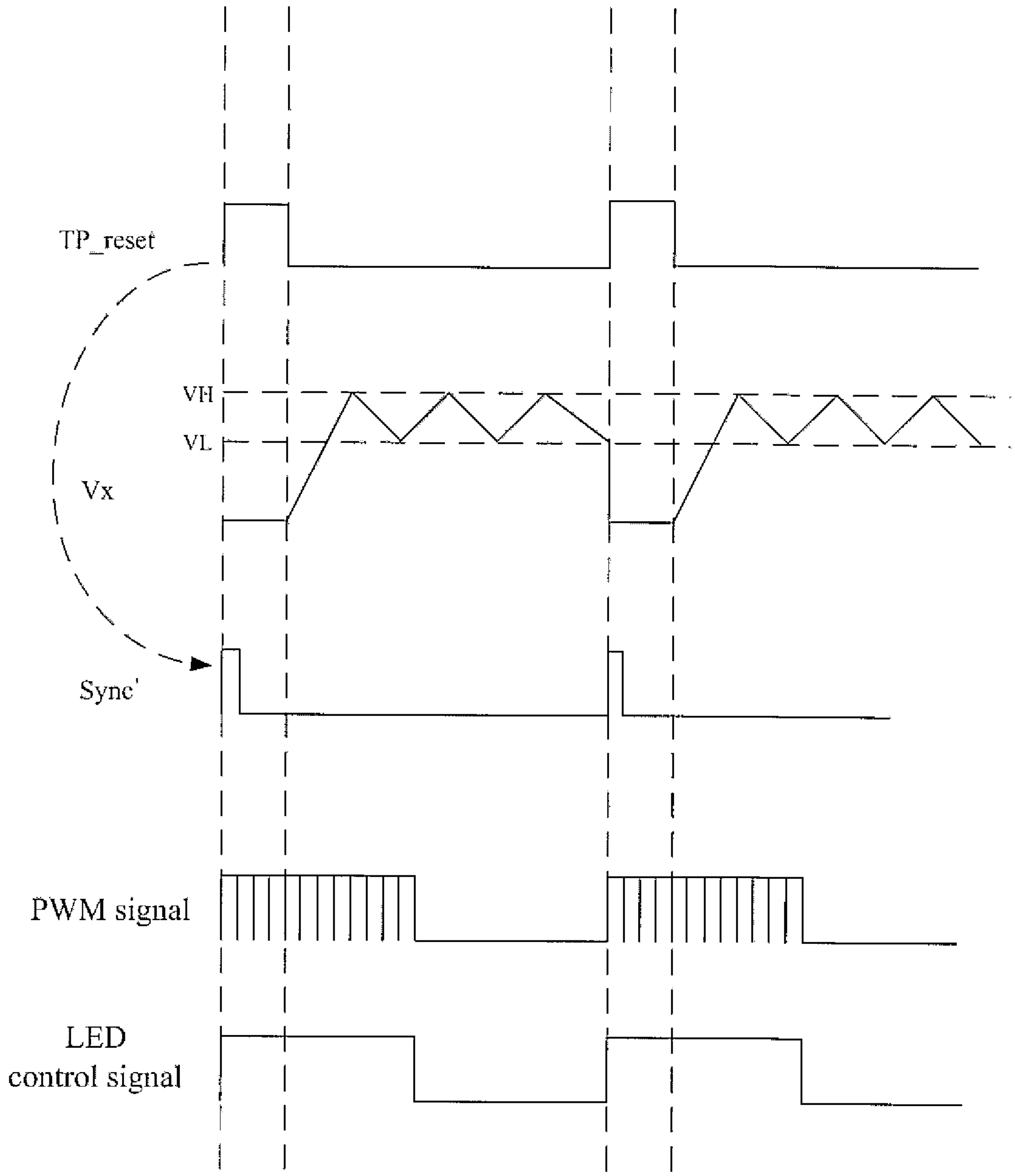
FIG. 9 shows an oscillogram of signals associated with the embodiments in FIG. 3 and FIG. 8.

FIG. 9 shows an oscillogram of signals associated with the embodiments in FIG. 3 and FIG. 8. After the touch control circuit 810 asserts the reset signal TP_reset, the voltage $V_X$ oscillates between the reference comparison voltages $V_H$ and $V_L$ with the sensing frequency. More specifically, a square wave with the sensing frequency (not shown) is generated at the output Vout of the hysteresis comparator 320. The touch control circuit 810, when asserting the touch reset signal TP_reset, provides a synchronous signal Sync' associated with the touch reset signal TP_reset to the PWM circuit 820 to generate the PWM signal 824 or an LED control signal.

Figure 10:
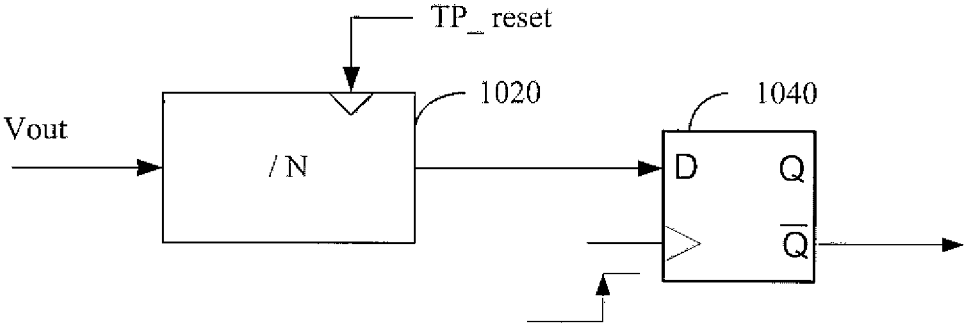
FIG. 10 shows a circuit for detecting a sensing frequency according to one embodiment of the present disclosure.

FIG. 10 shows a circuit for detecting sensing frequency according to one embodiment of the present disclosure. The circuit comprises a flip-flop 1040 and a frequency divider 1020, with a divisor of N, coupled to the flip-flop 1040. In this embodiment, the frequency divider 1020 receives the output signal Vout of the hysteresis comparator 320 in FIG. 3, and starts frequency dividing when triggered by the touch reset signal TP_reset. After frequency dividing, a triggering signal enters a clock input terminal of the flip-flop 1040 at an appropriate timing. The signal at the input terminal D of the flip-flop 1040 is sampled, and an inversion of the sampling output is generated at a terminal $\overline{Q}$ of the flip-flop 1040 to indicate whether a corresponding contact point is touched. For example, the frequency divider 1020 can be a ring counter. The appropriate timing described above may represent a predetermined period to detect whether the frequency divider 1020 reaches a predetermined value. A high level or a low level generated at the output terminal represents whether the sensing frequency is higher than the predetermined value. The predetermined period described above may be determined by an amount of clock cycles generated by a clock generator (not shown) in a display controller (not shown). Therefore, the timing for sending the triggering signal at the clock input terminal of the flip-flop 1040 can be properly determined such that the frequency of the output signal Vout can be detected.

For example, a liquid crystal display (LCD) comprises a control circuit board provided with a display controller such as a scaler or a television controller. Persons skilled in the art perceive that the display controller is very noisy while a touch control circuit is very noise-sensitive, so the prior art can not integrate the display controller with the touch control circuit. Through the embodiments disclosed above, persons skilled in the art are able to integrate a capacitive touch control circuit into a scaler or a television controller for lowering costs and complexity of assembly.

Figure 11:
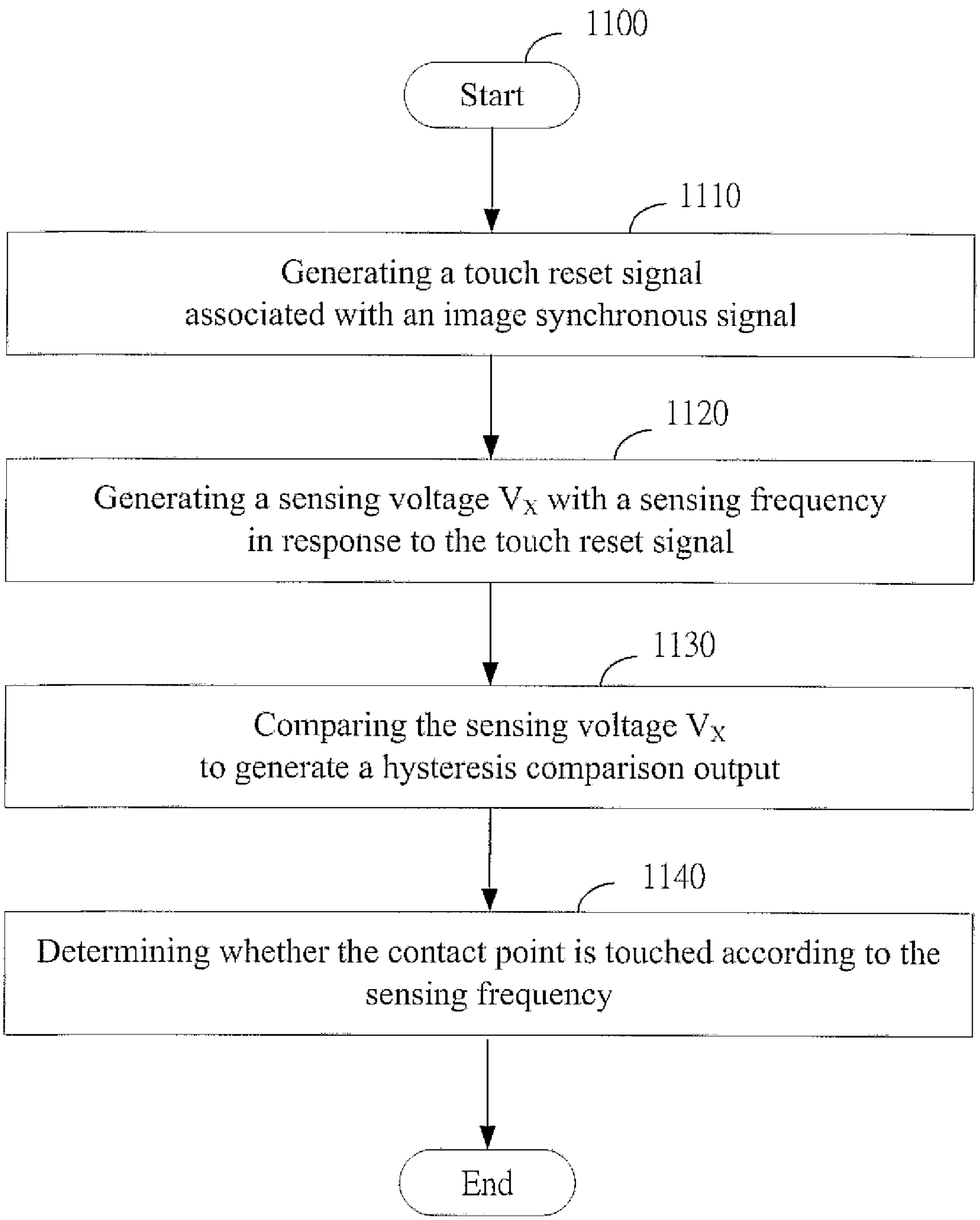
FIG. 11 shows a flow chart of a touch sensing method according to one embodiment of the present disclosure.

FIG. 11 shows a flow chart of a touch sensing method applied to a display controller according to one embodiment of the present disclosure. The flow chart starts at 1100. At 1110, a touch reset signal TP_reset associated with an image synchronous signal is generated. The image synchronous signal may be a horizontal synchronous signal Hsync, a vertical synchronous signal Vsync, or an output horizontal synchronous signal OHsync. For example, the touch reset signal TP_reset is synchronized with the image synchronous signal, but is not limited to have the same frequency as that of the image synchronous signal. For example, the frequency of the touch reset signal TP_reset is proportional to that of the image synchronous signal, and the rising edges of the touch reset signal TP_reset and the image synchronous signal are aligned. For example, in the circuit embodiments disclosed above, the touch reset signal TP_reset may be associated with the image synchronous signal. Further, the PWM signal is associated with the image synchronous signal, and the touch reset signal TP_reset is associated with the PWM signal, and vice versa. At 1120, in response to the touch reset signal TP_reset, a contact point is charged or discharged to generate the sensing voltage $V_X$ with the sensing frequency. At 1130, the sensing voltage $V_X$ is compared with two reference comparison voltages to generate a hysteresis comparison output. At 1140, whether the contact point is touched is determined according to the sensing frequency. Accordingly, a control signal can be generated to control LED. Preferably, two current sources, controlled by the hysteresis comparison output, can be applied to perform charging and discharging.

The present disclosure provides a display controller, fabricated on a semiconductor substrate, comprising a touch control circuit and a PWM circuit. The touch control circuit asserts a touch reset signal to detect whether a contact point is touched. The PWM circuit, coupled to the touch control circuit, generates a PWM signal. The touch reset signal and the PWM signal are associated with an image synchronous signal, which is, for example, a horizontal synchronous signal, a vertical synchronous signal, or an output horizontal synchronous signal. The touch reset signal aligns with the image synchronous signal. Further, the touch control circuit receives the image synchronous signal to generate a synchronous signal to the PWM circuit, which then generates the PWM signal which is synchronized with the synchronous signal. Preferably, a frequency of the touch reset signal is proportional to a frequency of the image synchronous signal.

The present disclosure provides a touch control circuit, integrated into a display controller, comprising a first current source, a second current source, a plurality of switches, a hysteresis comparator, a frequency divider, and a flip-flop. The switches are coupled to a plurality of external contact points, respectively. The hysteresis comparator, coupled to a first reference comparison voltage and a second reference comparison voltage, selectively couples one of the contact points to an input terminal thereof through the switches. The first current source and the second current source are coupled to the input terminal of the hysteresis comparator to generate a sensing voltage. The hysteresis comparator compares the sensing voltage with the first reference comparison voltage and the second reference comparison voltage to generate a hysteresis comparison output for alternatively enabling the first current source and the second current source. The frequency divider receives the hysteresis comparison output and starts frequency dividing to generate a frequency-divided signal. The flip-flop is coupled to the frequency divider to sample the frequency-divided signal to generate a sampling output, which represents whether or not a frequency of the hysteresis comparison output is higher than a predetermined value.

The present disclosure provides a touch sensing method, which is applied to a display controller, that includes: generating a touch reset signal associated with an image synchronous signal; generating a sensing voltage with a sensing frequency in response to the touch reset signal corresponding to a contact point; and determining whether the contact point is touched according to the sensing frequency. When it is determined that the contact point is touched, a control sequence is generated to control emissions of a plurality of light emitting diodes on a contact plate.

While the disclosure has been described in terms of what is presently considered to be the most practical and preferred embodiments, it is to be understood that the disclosure needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A display controller fabricated on a semiconductor substrate, comprising:

a touch control circuit configured to detect whether a contact point is touched; and a pulse width modulation (PWM) circuit coupled to the touch control circuit and a lighting module, the PWM circuit configured to generate a PWM signal that controls operations of the lighting module, wherein the touch control circuit is configured to receive an image synchronous signal, and wherein, in response to receiving the image synchronous signal, the touch control circuit is configured to trigger the PWM circuit to generate the PWM signal.

2. The display controller as claimed in claim 1, wherein the image synchronous signal is a horizontal synchronous signal, a vertical synchronous signal, or an output horizontal synchronous signal.

3. The display controller as claimed in claim 1, wherein the touch reset signal is aligned with the image synchronous signal.

4. The display controller as claimed in claim 3, wherein the touch control circuit receives the image synchronous signal to provide the synchronous signal to the PWM circuit, which then generates the PWM signal to align with the synchronous signal.

5. The display controller as claimed in claim 1, wherein the PWM signal is aligned with the image synchronous signal.

6. The display controller as claimed in claim 1, wherein the touch control circuit is coupled to an external contact plate.

7. The display controller as claimed in claim 6, wherein the external contact plate comprises a plurality of light emitting diodes, and wherein the touch control circuit controls emissions of the light emitting diodes.

8. The display controller as claimed in claim 1, wherein the touch control circuit asserts a touch reset signal, and wherein a frequency of the touch reset signal is proportional to a frequency of the image synchronous signal.

9. The display controller as claimed in claim 1, wherein the lighting module is a backlight that comprises a plurality of light emitting diodes.

10. A touch sensing method applied to a display controller fabricated on a semiconductor substrate, the method comprising:

receiving, by a touch control circuit, an image synchronous signal;

providing, by the touch control circuit in response to receiving the image synchronous signal, a synchronous signal to a pulse width modulation (PWM) circuit coupled to the touch control circuit;

controlling, by the PWM circuit, operations of a lighting module in response to receiving the synchronous signal from the touch control circuit; and determining, by the touch control circuit, whether a contact point is touched.

11. The method as claimed in claim 10, wherein the image synchronous signal is a horizontal synchronous signal, a vertical synchronous signal, or an output horizontal synchronous signal.

12. The method as claimed in claim 10, further comprising:

asserting, by the touch control circuit, a touch reset signal, wherein the touch reset signal is aligned with the image synchronous signal.

13. The method as claimed in claim 10, wherein the synchronous signal is aligned with the image synchronous signal.

14. The method as claimed in claim 10, further comprising:

generating a control sequence to control emissions of a plurality of light emitting diodes on a contact plate when it is determined that the contact point is touched.

15. A touch control circuit as an integrated part of a display controller, the touch control circuit comprising:

a first current source configured to receive and operate according to a control signal;

a second current source configured to receive and operate according to the control signal;

a plurality of switches coupled to a plurality of external contact points; and a hysteresis comparator, coupled to a first reference comparison voltage and a second reference comparison voltage, and selectively coupled to one of the external contact points through the switches, the hysteresis comparator having an input terminal coupled to the first current source and the second current source to generate a sensing voltage, the hysteresis comparator configured to compare the sensing voltage with the first reference comparison voltage and the second reference comparison voltage to generate a hysteresis comparison output as the control signal to control operations of the first current source and the second current source.

16. The circuit as claimed in claim 15, further comprising:

a frequency divider that divides a frequency of the hysteresis comparison output and generates a frequency-divided signal; and a flip-flop coupled to the frequency divider to sample the frequency-divided signal to generate a sampling output.

* * * * *